(12) United States Patent
Jacobson et al.

(10) Patent No.: US 7,816,055 B2
(45) Date of Patent: Oct. 19, 2010

(54) COMPACT FUEL CELL

(75) Inventors: Craig Jacobson, Moraga, CA (US); Lutgard C. DeJonghe, Lafayette, CA (US); Chun Lu, Richland, WA (US)

(73) Assignee: The Regents of the University of California, Oakland, CA (US)

( * ) Notice: Subject to any disclaimer, the term of this patent is extended or adjusted under 35 U.S.C. 154(b) by 1068 days.

(21) Appl. No.: 10/598,982

(22) PCT Filed: Mar. 16, 2005

(86) PCT No.: PCT/US2005/009308

§ 371 (c)(1), (2), (4) Date: Sep. 15, 2006

(87) PCT Pub. No.: WO2006/014190

PCT Pub. Date: Feb. 9, 2006

(65) Prior Publication Data

US 2007/0259235 A1  Nov. 8, 2007

Related U.S. Application Data

(60) Provisional application No. 60/553,390, filed on Mar. 16, 2004.

(51) Int. Cl.
- H01M 2/08 (2006.01)
- H01M 2/14 (2006.01)
- H01M 2/38 (2006.01)
- H01M 2/40 (2006.01)
- H01M 8/24 (2006.01)
- H01M 2/20 (2006.01)

(52) U.S. Cl. ............. 429/509; 429/456; 429/460; 429/463; 429/469; 429/471; 429/508

(58) Field of Classification Search ............. 429/34, 429/38, 39, 35
See application file for complete search history.

(56) References Cited

U.S. PATENT DOCUMENTS 5,100,742 A  3/1992  Wang et al.

(Continued)

OTHER PUBLICATIONS

Souza et al., "Reduced-Temperature Solid Oxide Fuel Cell Based on YSZ Thin-Film Electrolyte," Journal of the Electrochemical Society, vol. 144 ( No. 3), p. L35-L37, (Mar. 1997).

(Continued)

*Primary Examiner*—Patrick Ryan
*Assistant Examiner*—Julian Mercado
(74) *Attorney, Agent, or Firm*—Lawrence Edelman; Lawrence Berkeley; National Laboratory

(57) ABSTRACT

A novel electrochemical cell which may be a solid oxide fuel cell (SOFC) is disclosed where the cathodes (144, 140) may be exposed to the air and open to the ambient atmosphere without further housing. Current collector (145) extends through a first cathode on one side of a unit and over the unit through the cathode on the other side of the unit and is in electrical contact via lead (146) with housing unit (122 and 124). Electrical insulator (170) prevents electrical contact between two units. Fuel inlet manifold (134) allows fuel to communicate with internal space (138) between the anodes (154 and 156). Electrically insulating members (164 and 166) prevent the current collector from being in electrical contact with the anode.

21 Claims, 13 Drawing Sheets

U.S. PATENT DOCUMENTS

| | | | |
|---|---|---|---|
| 5,145,754 | A | * 9/1992 | Misawa et al. ............... 429/32 |
| 5,492,777 | A | 2/1996 | Isenberg et al. |
| 5,686,197 | A | 11/1997 | Nishida et al. |
| 2003/0096147 | A1 | 5/2003 | Badding et al. |

OTHER PUBLICATIONS

Visco et al., "Development of Low-Cost Alloy Supported SOFCs," Eighth International Symposium on Solid Oxide Fuel Cells, Paris, France (Apr. 27, 2003-May 2, 2003).

Yamahara et al., "High-Performance Thin Film SOFCs for Reduced Temperature," 14th International Conference on Solid State Ionics, Monterey, Calif (Jun. 22, 2003-Jun. 27, 2003) and subsequently published as "Thin Film SOFCs with Cobalt-Infiltrated Cathodes," Solid State Ionics, vol. 176, p. 275-279, (2005).

Jacobson et al., "Thin-Film Solid Oxide Fuel Cells for Intermediate Temperature (500-800 C) Operation," Proceedings of the Processing and Characterization of Electrochemical Materials and Devices (The American Ceramic Society), (Apr. 25, 1999-Apr. 28, 1999).

* cited by examiner

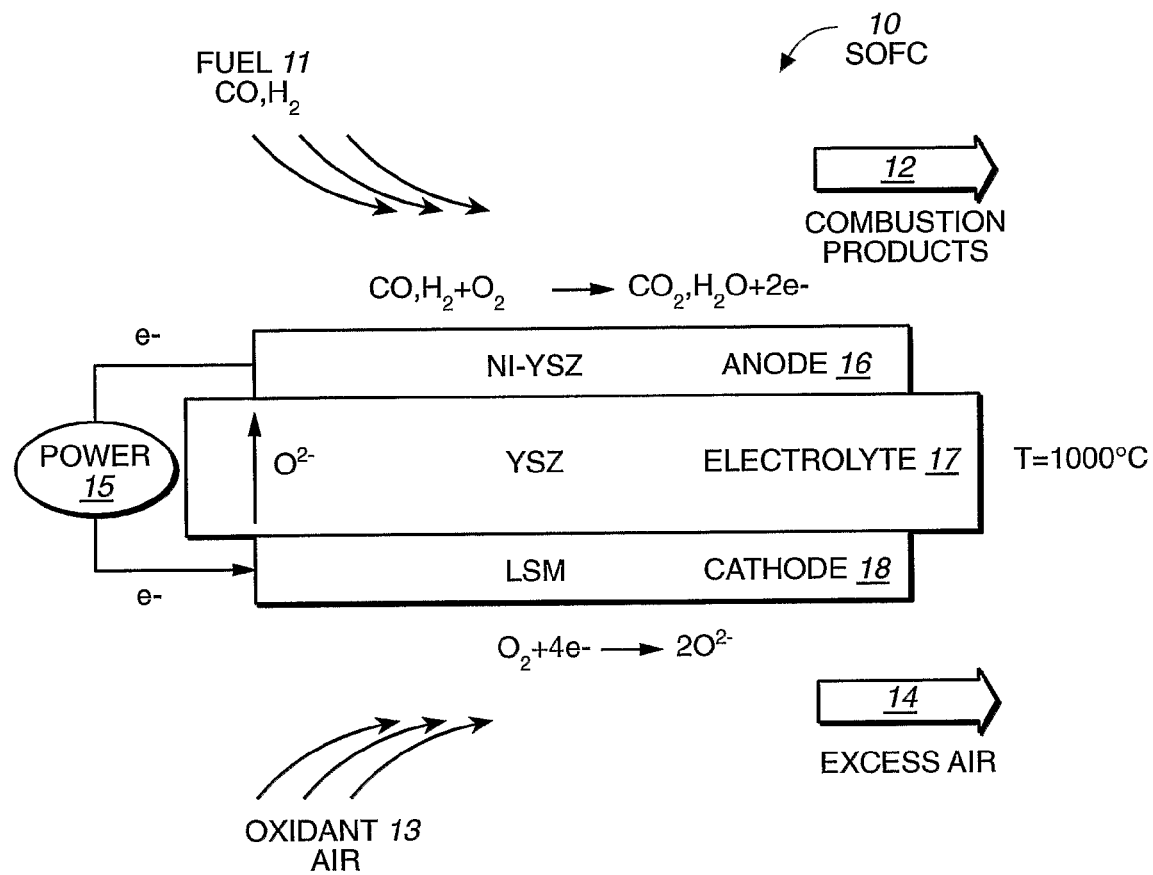
FIG._1 (PRIOR ART)

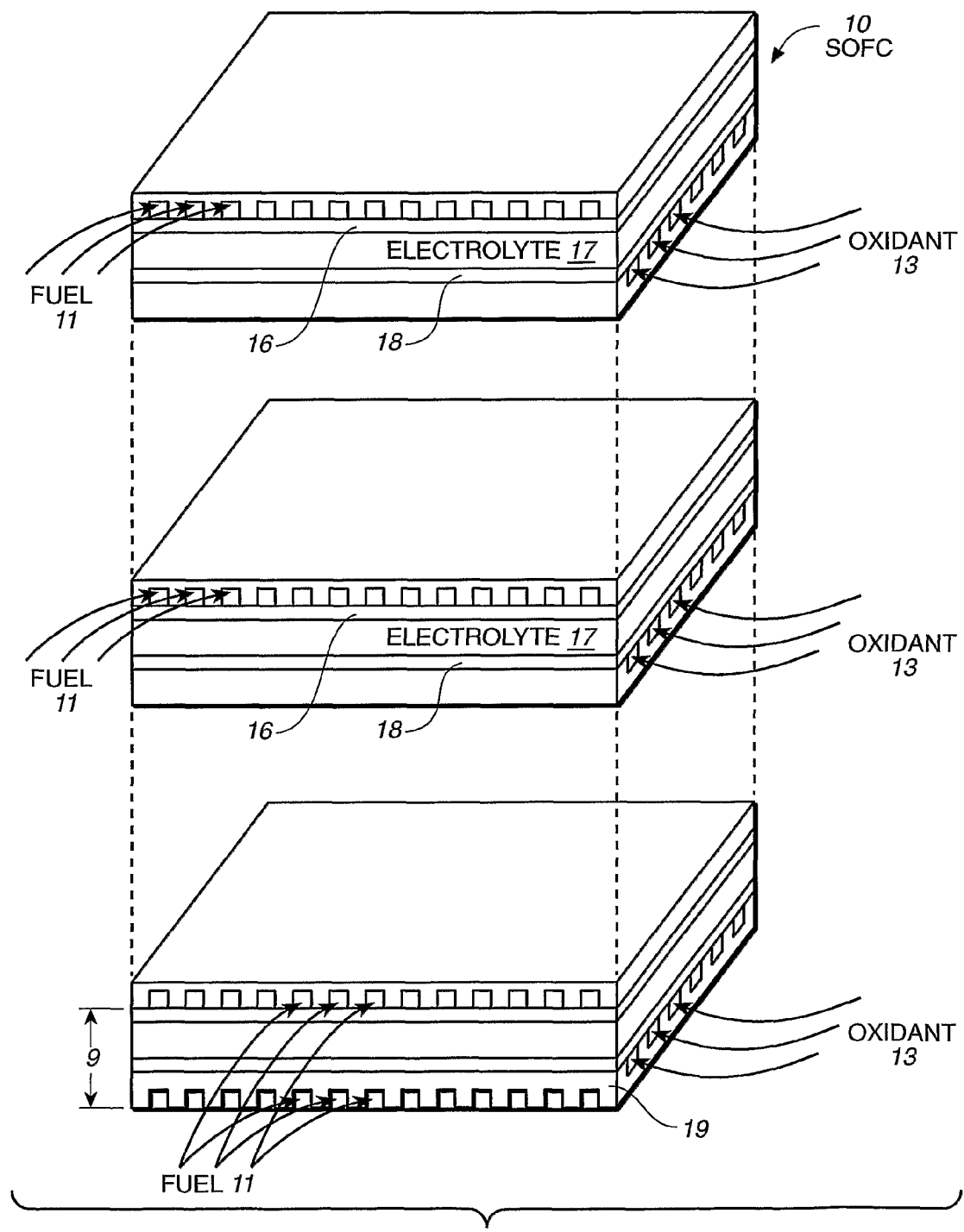
FIG._2 (PRIOR ART)

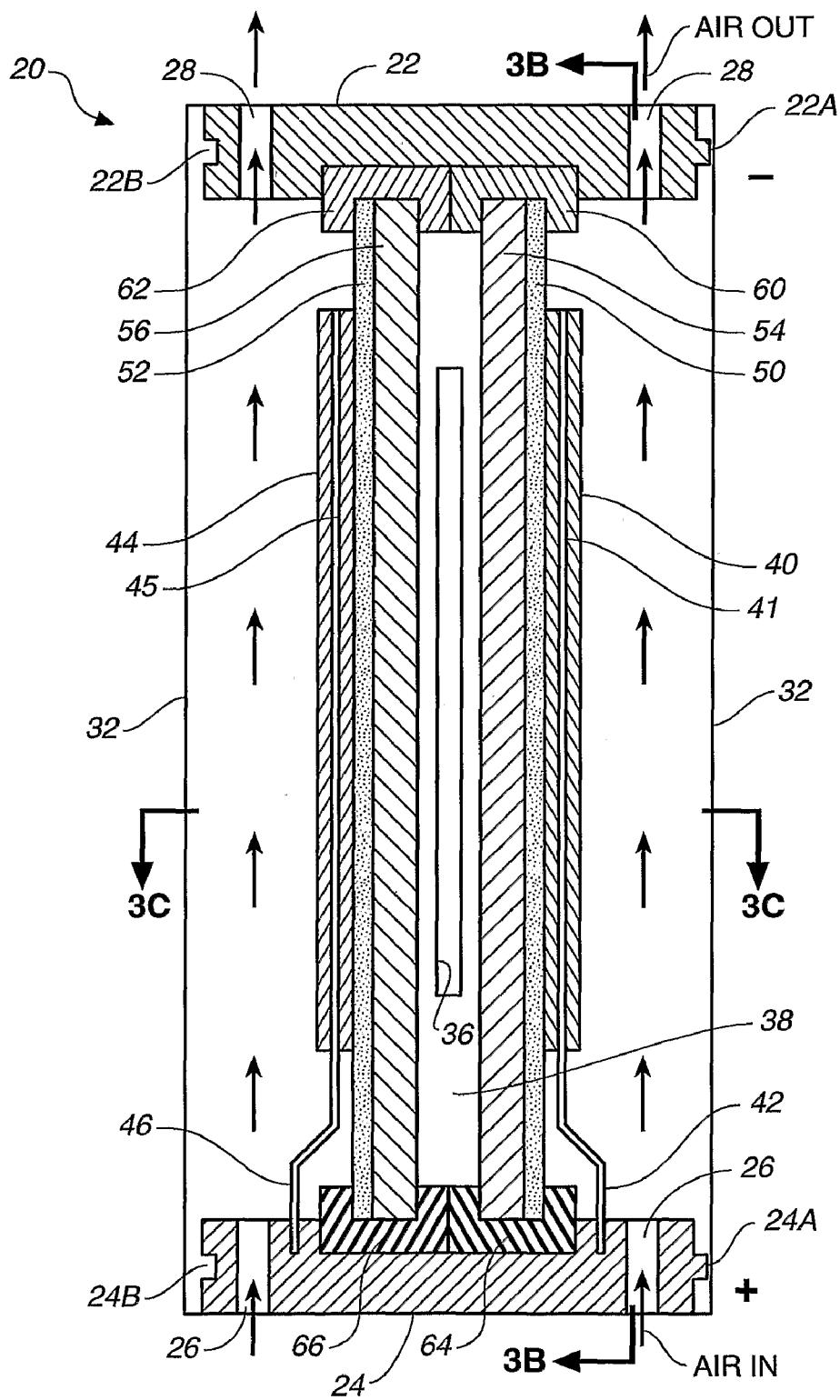
FIG._3A

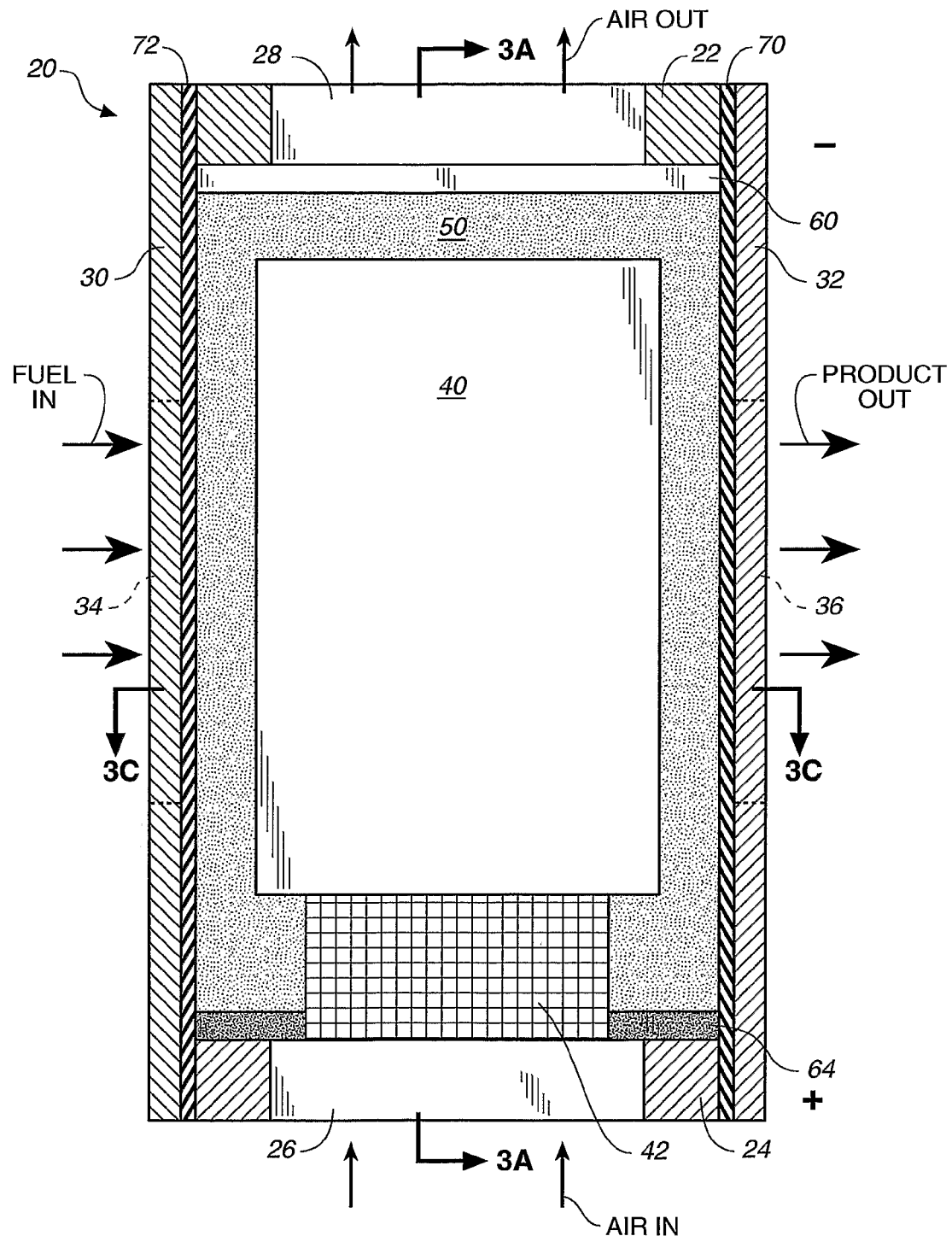
FIG._3B

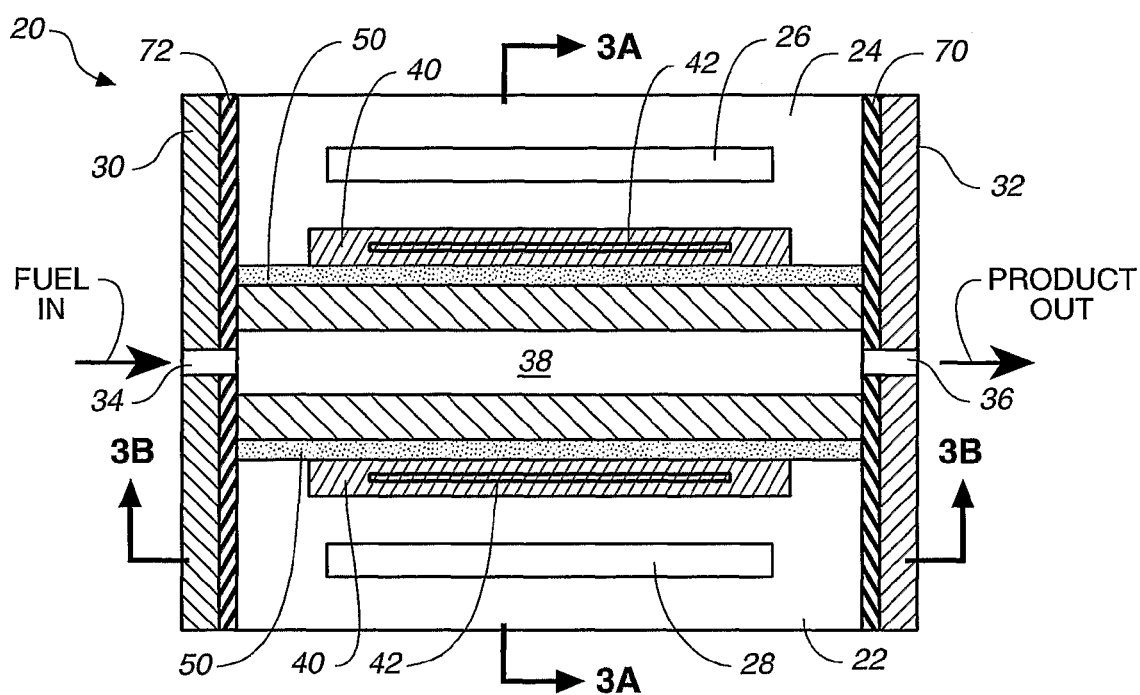
FIG._3C

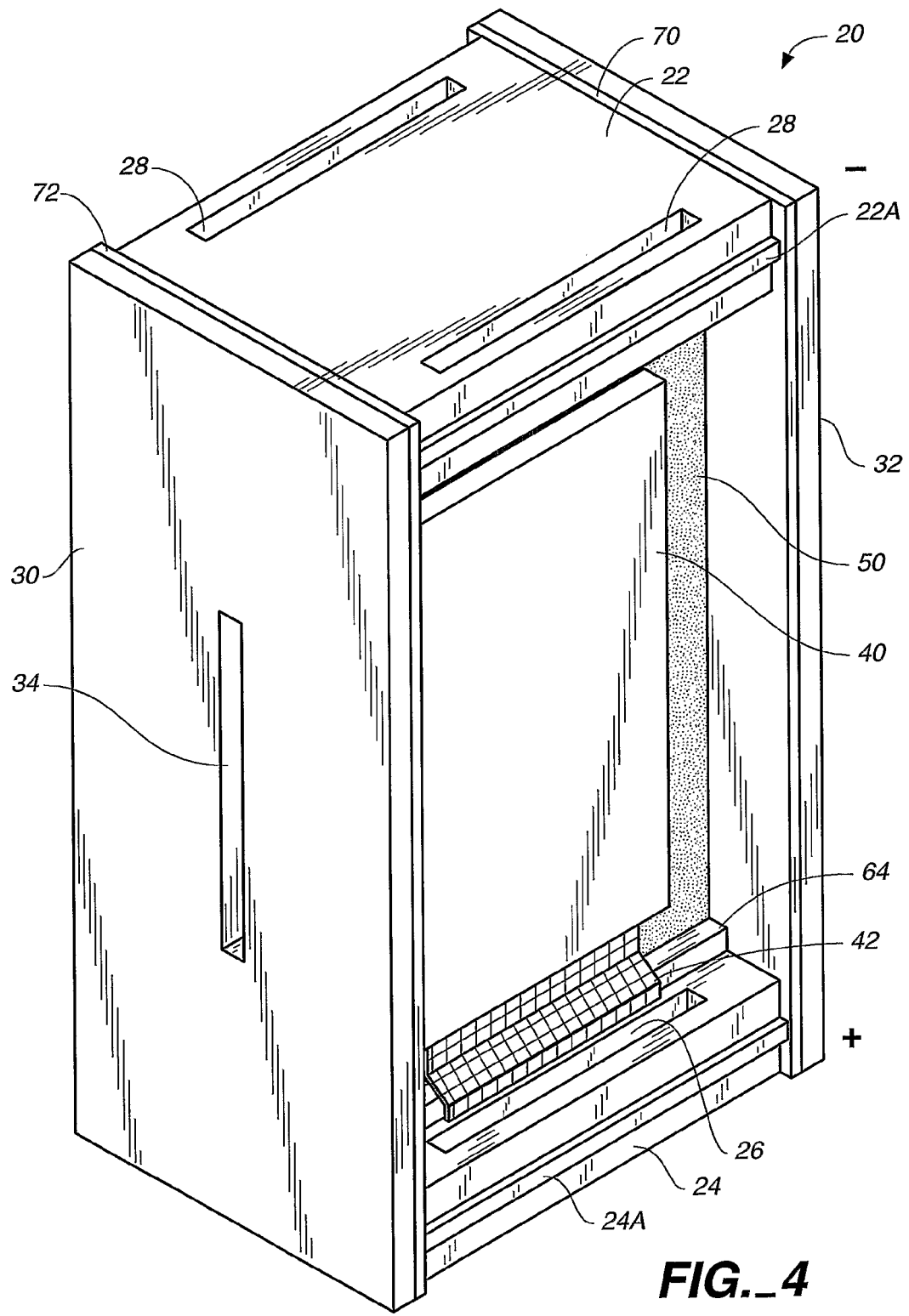
FIG._4

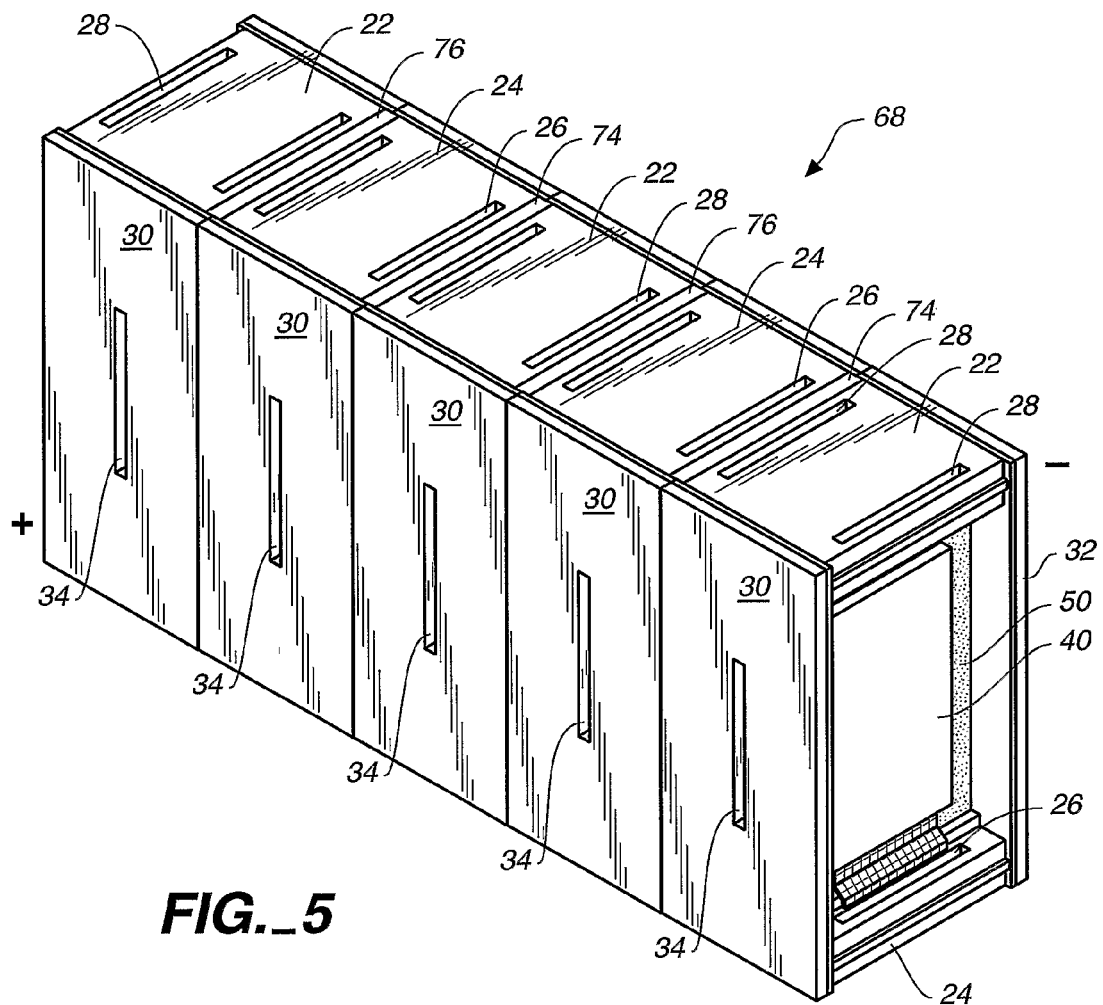
FIG._5
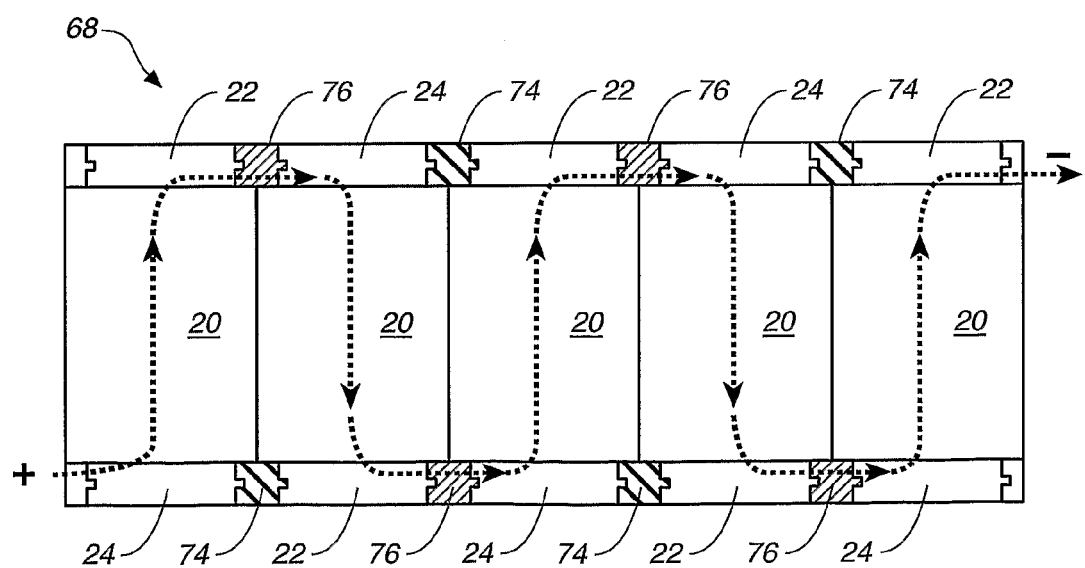
FIG._6

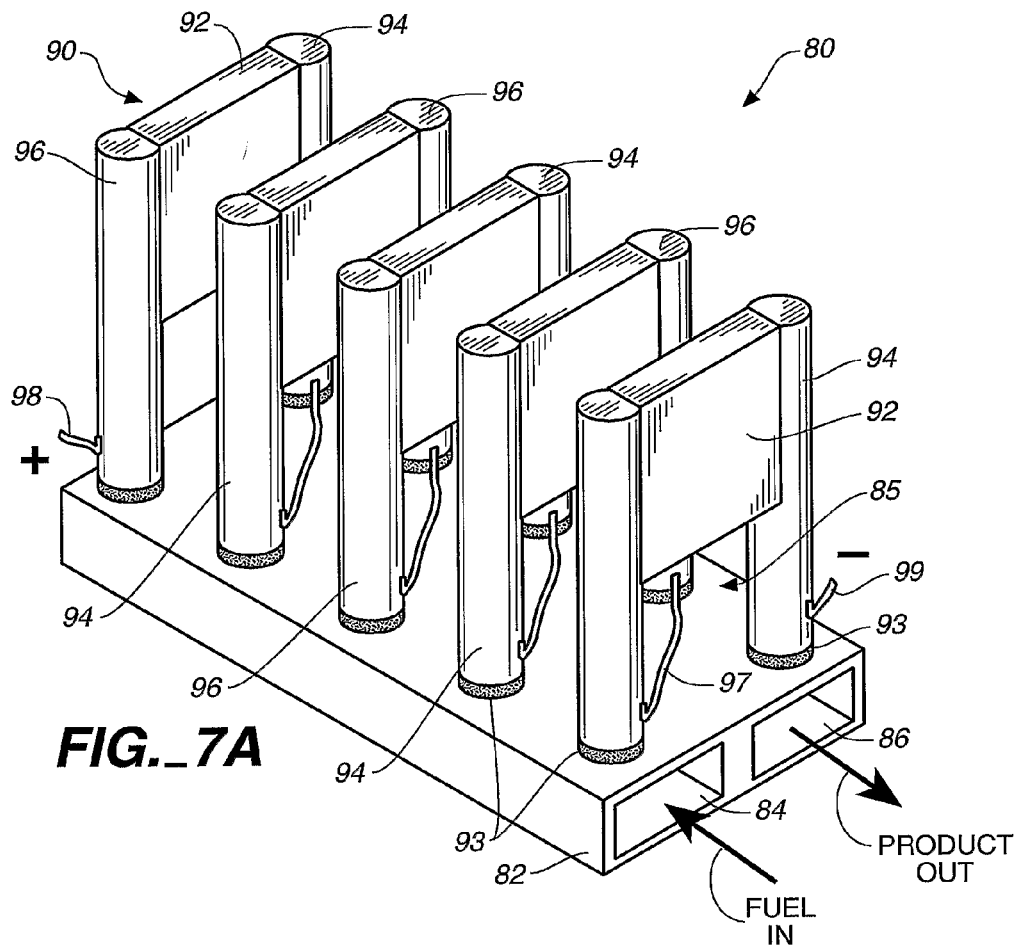
FIG._7A
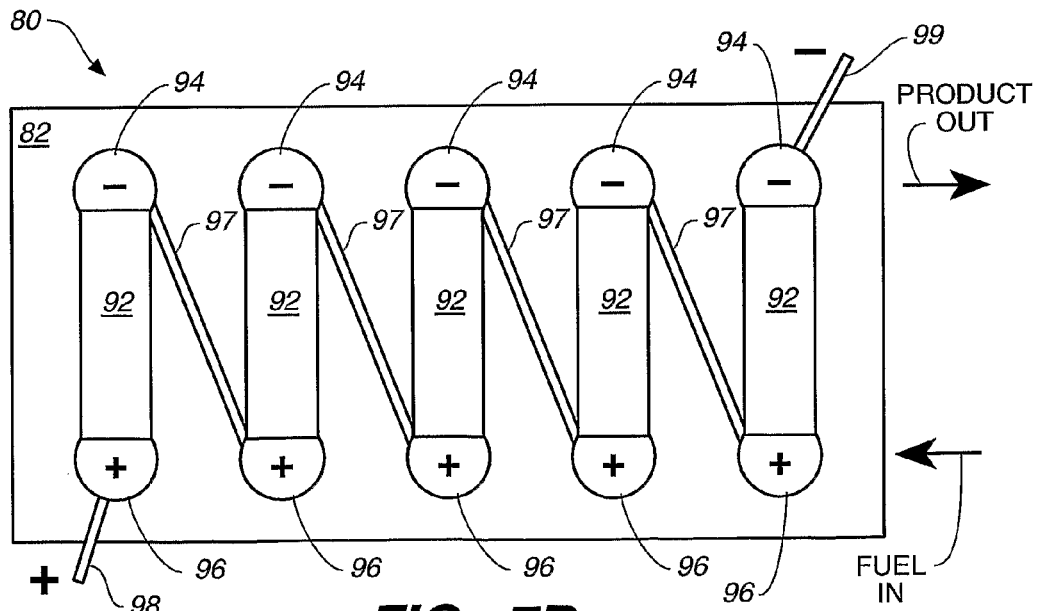
FIG._7B

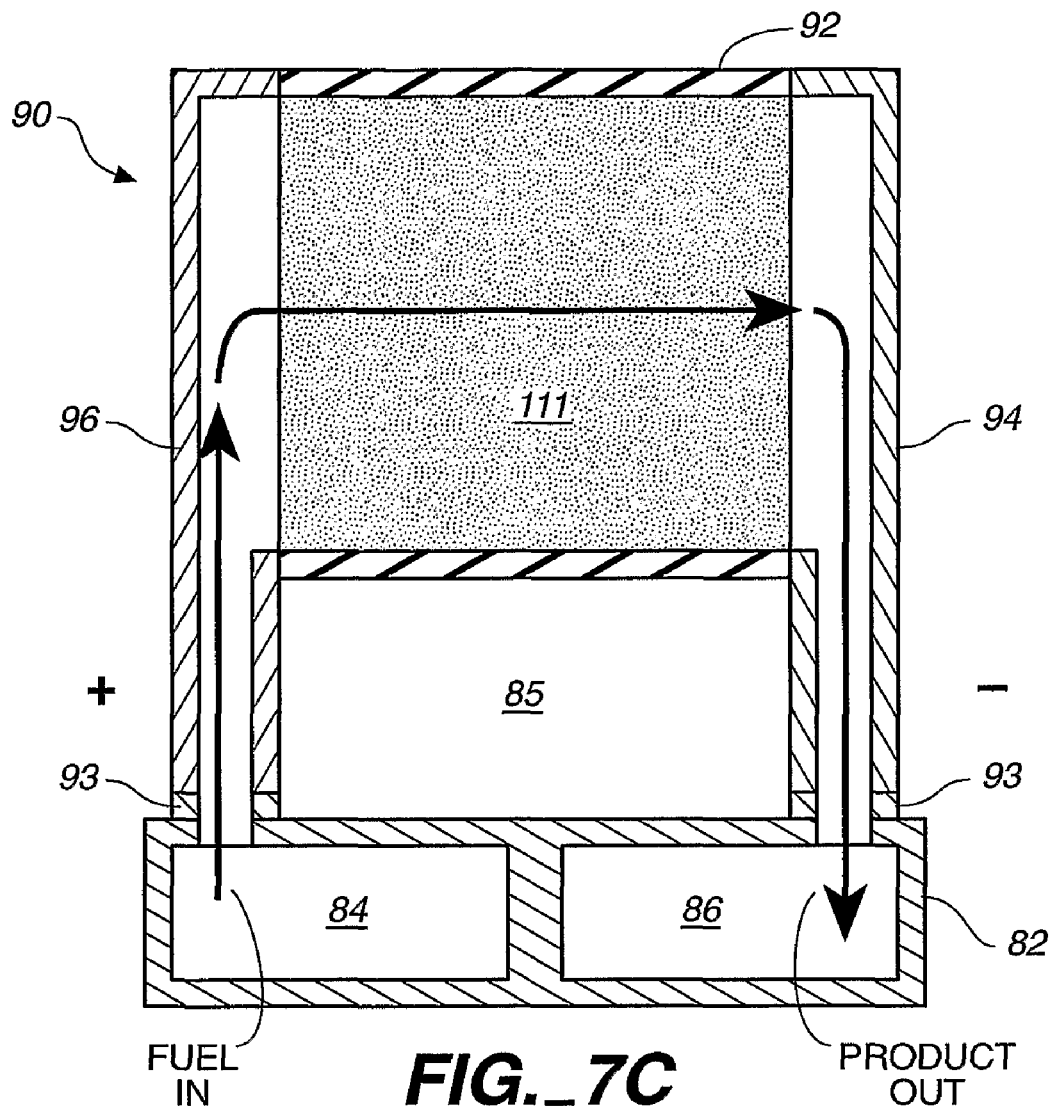
FIG._7C

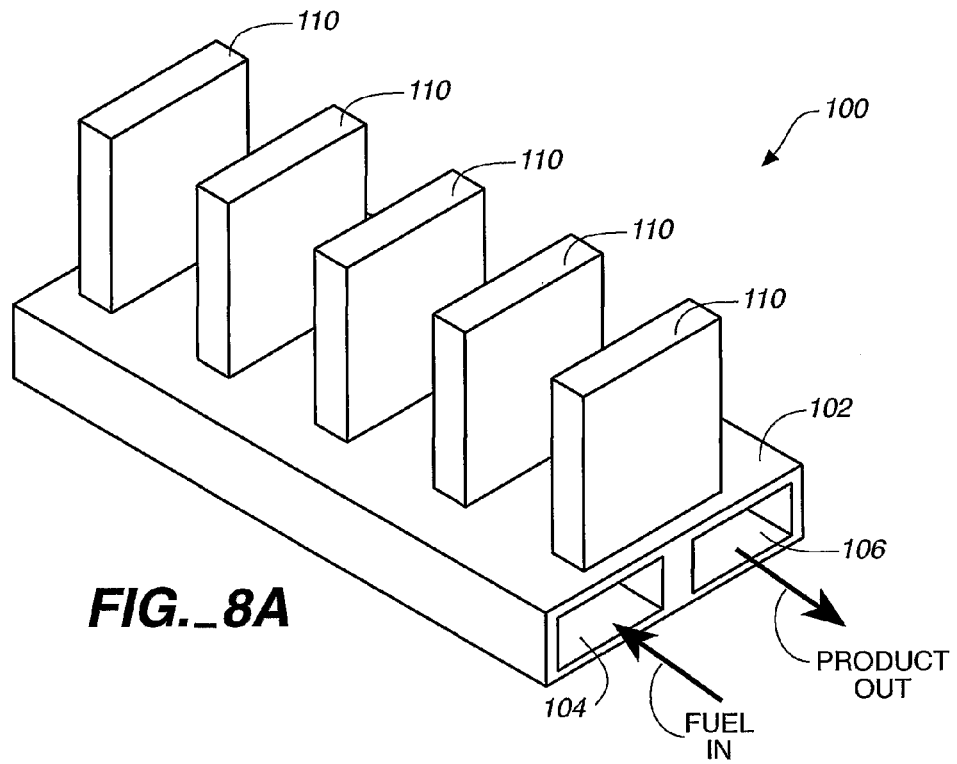
FIG._8A
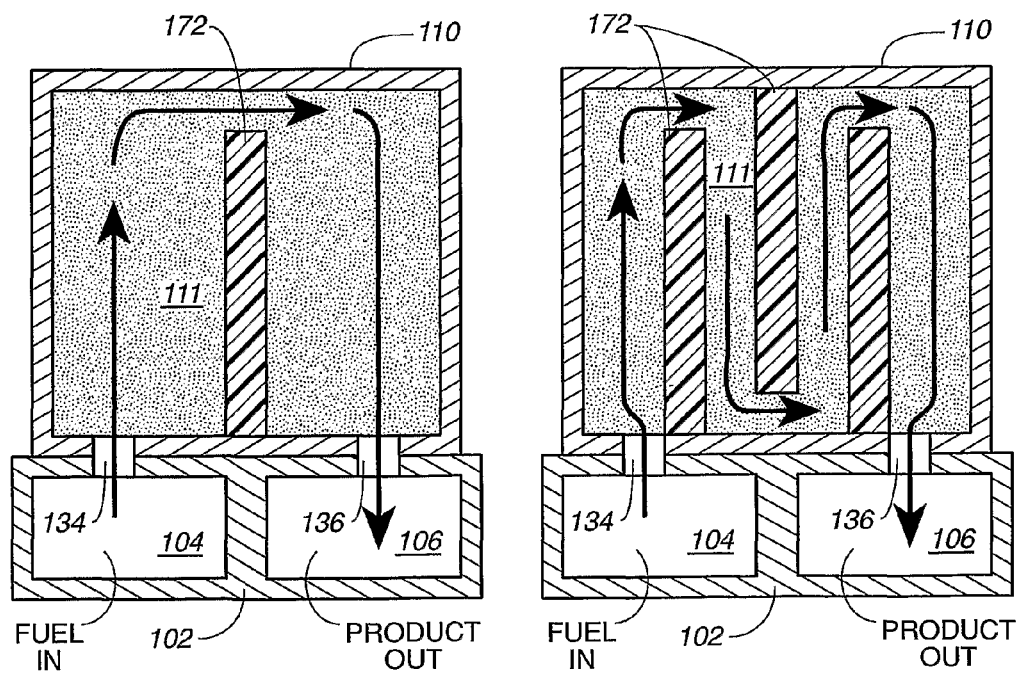
FIG._8C  FIG._8D

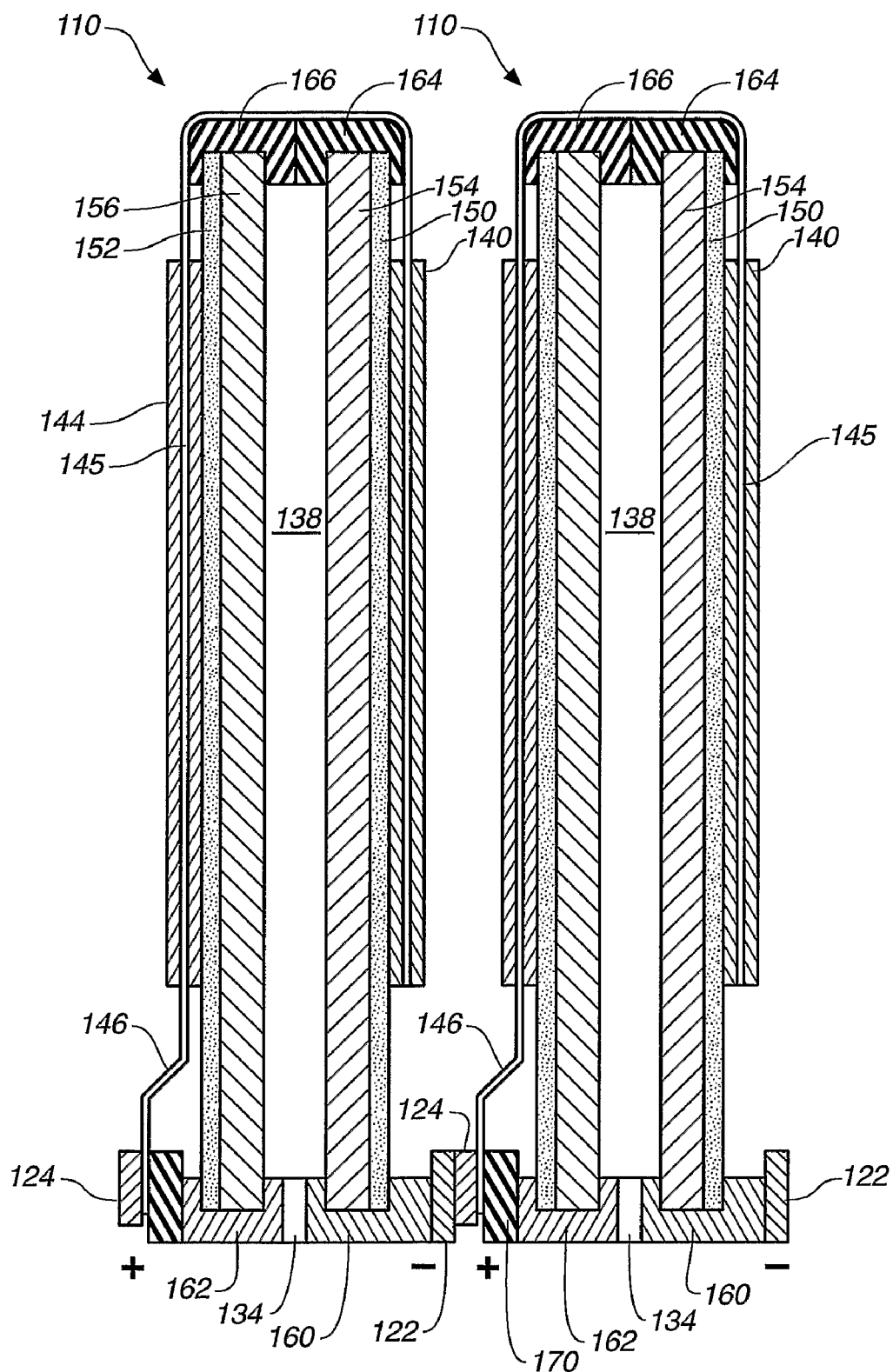
FIG._8B

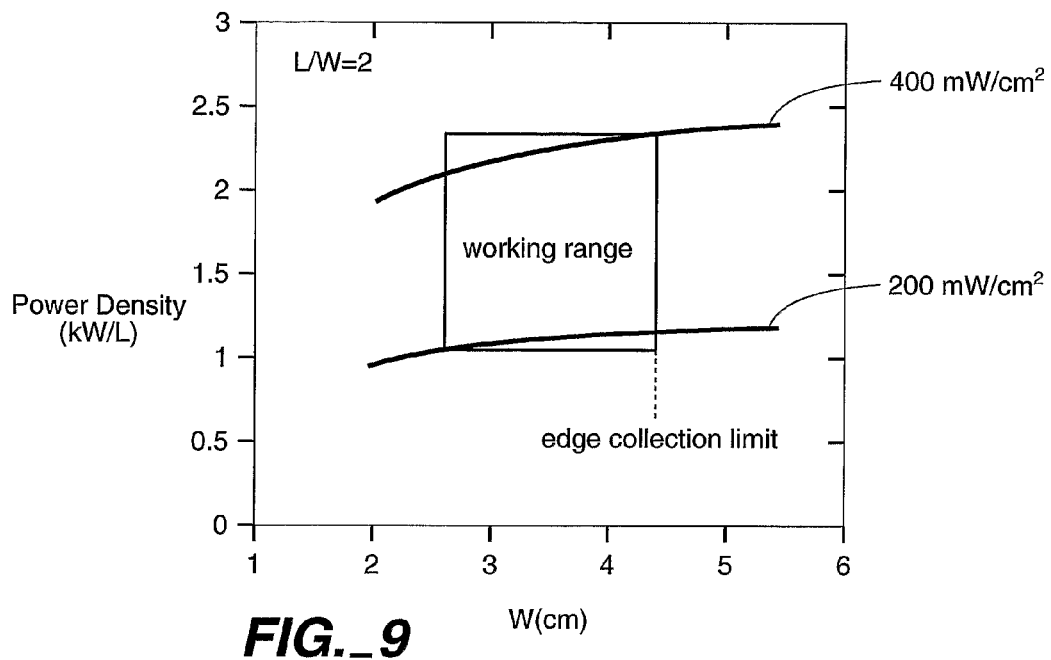
FIG._9
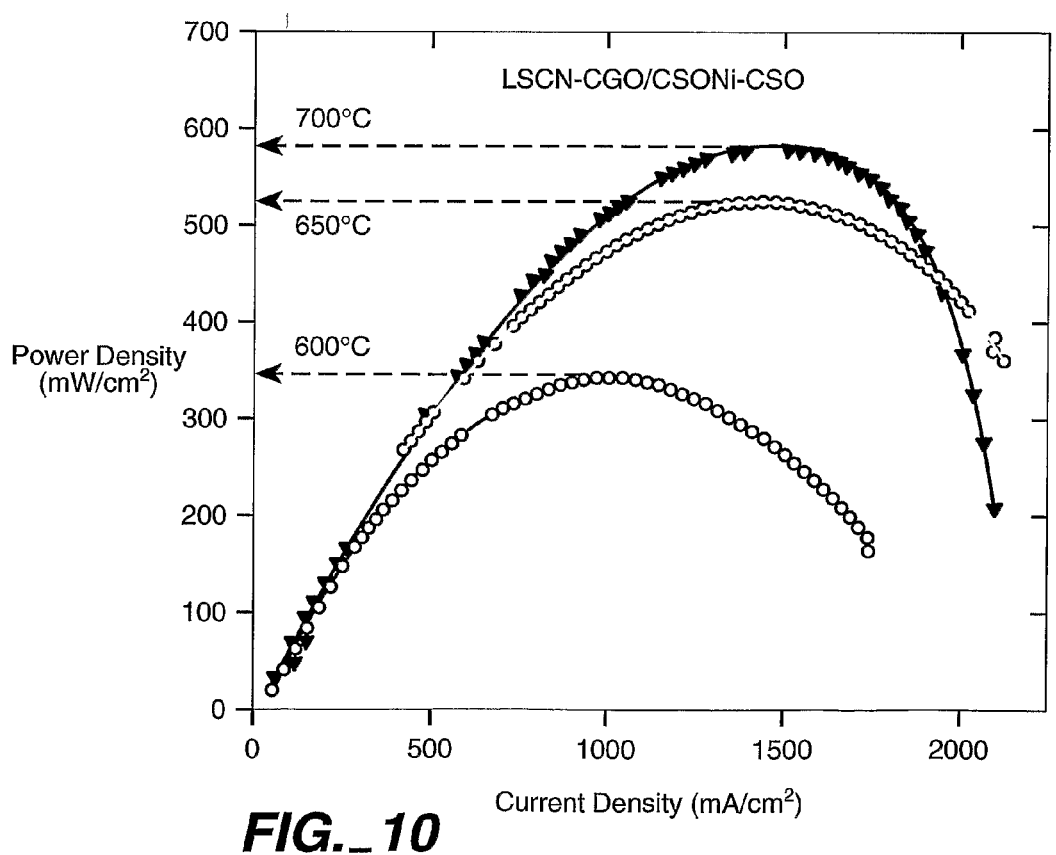
FIG._10

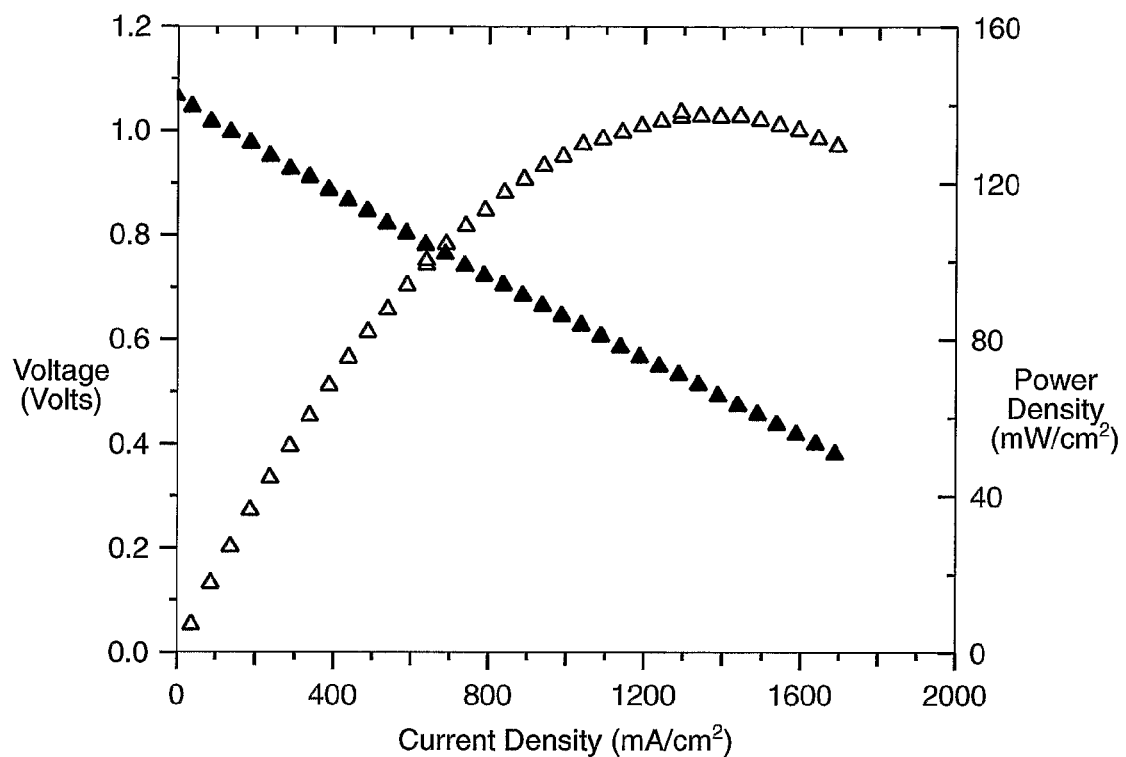
FIG._11
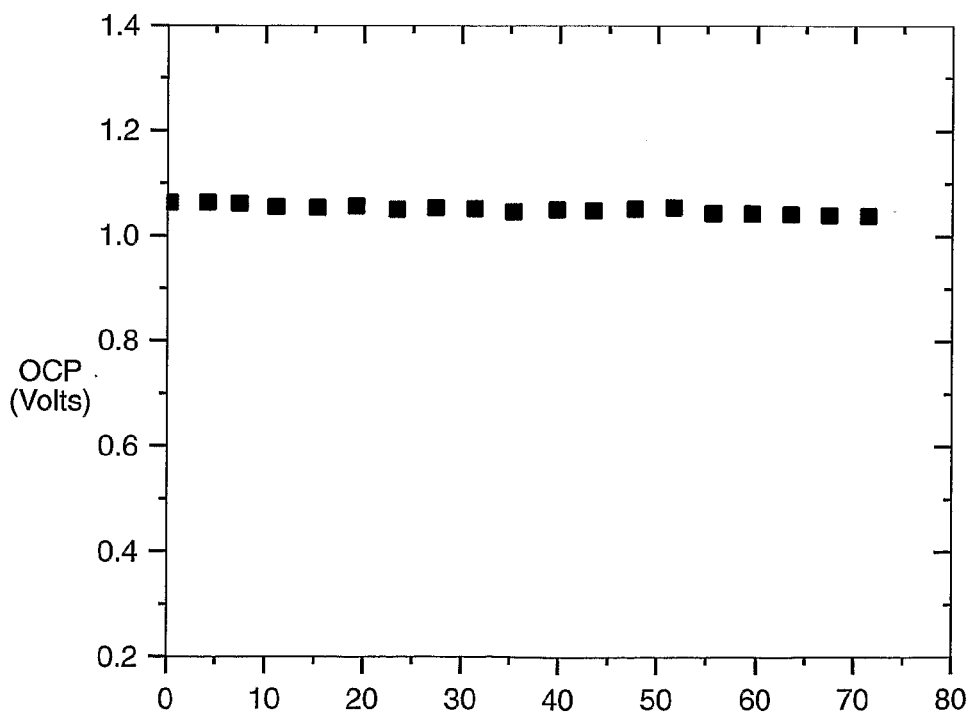
FIG._12

COMPACT FUEL CELL

CROSS-REFERENCE TO RELATED APPLICATIONS

This application is a National Stage Entry of PCT Application No. PCT/US05/09308, filed Mar. 16, 2005, which in turn claims priority to U.S. Provisional Application No. 60/553,390 filed Mar. 16, 2004, the contents of which are hereby incorporated by reference in their entirety.

STATEMENT OF GOVERNMENTAL SUPPORT

This invention was made during work supported by U.S. Department of Energy under Contract No. DE-AC03-76SF00098. The government has certain rights in this invention.

BACKGROUND OF THE INVENTION

1. Field of the Invention

The present invention relates to the field of electrochemical devices, and more specifically solid oxide fuel cells, SOFC, and oxygen generators.

2. Background

Steadily increasing demand for power and the atmospheric build up of greenhouse and other combustion gases has spurred the development of alternative energy sources for the production of electricity. Fuel cells hold the promise of an efficient, low pollution technology for generating electricity. Because there is no combustion of fuel involved in the process, fuel cells do not create any of the pollutants that are commonly produced in the conventional generation of electricity by boilers or furnaces and steam driven turbines.

The present cost of electrical energy production from fuel cells is several times higher than the cost of the same electrical production from fossil fuels. The high cost of capitalization and operation per kilowatt of electricity produced has delayed the commercial introduction of fuel cell generation systems.

Solid oxide fuel cells offer the potential of high volumetric power density combined with fuel flexibility. Considerable progress is being made in raising the performance of solid oxide fuel cells, and as an example, one of the present inventors was the first to demonstrate that power densities of as much as 2 W/cm$^2$ could be obtained for supported thin-film yttria-stabilized zirconia (YSZ) solid oxide fuel cells, at 800° C., see S. de Souza, S. J. Visco, and L. C. De Jonghe, "Reduced-temperature solid oxide fuel cell based on YSZ thin-film electrolyte," *J. Electrochem. Soc.*, 144, L35-L37 (1997), the contents of which are hereby incorporated in their entirety for all purposes. While this result was encouraging, further reductions in temperature are necessary. Such reduction in operating temperature on the one hand makes the use of metallic interconnects and support electrodes possible, allowing for vast cost reduction, but on the other hand requires new ways of configuring fuel cells so that current can be collected with minimal resistive loss.

A conventional fuel cell is an electrochemical device that converts chemical energy from a chemical reaction with the fuel directly into electrical energy. Electricity is generated in a fuel cell through the electrochemical reaction that occurs between a fuel (typically hydrogen produced from reformed methane) and an oxidant (typically oxygen in air). This net electrochemical reaction involves charge transfer steps that occur at the interface between the ionically-conductive electrolyte membrane, the electronically-conductive electrode and the vapor phase of the fuel or oxygen. Water, heat and electricity are the only products of one type of fuel cell system designed to use hydrogen gas as fuel. Other types of fuel cells known in the prior art include molten carbonate fuel cells, phosphoric acid fuel cells, alkaline fuel cells, and proton exchange membrane fuel cells. Because fuel cells rely on electrochemical rather than thermo-mechanical processes in the conversion of fuel into electricity, the fuel cell is not limited by the Carnot efficiency experienced by conventional mechanical generators.

FIG. 1 illustrates a cross section of a fuel cell, in particular a solid oxide fuel cell (SOFC) (10). The SOFC unit consists of two electrodes, an anode (16) and a cathode (18) separated by an electrolyte (17). In this example, a Nickel-yttria-stabilized zirconia cermet (Ni/YSZ) is the material used for the anode (16). Lanthanum strontium maganite (LSM) is the material used for the cathode (18) and yttria-stabilized zirconia (YSZ) is used for the electrolyte. Many other combinations of materials may be used to construct a SOFC. Fuel (11), such as $H_2$ or $CH_4$ (the present invention may be used with fuels other than $H_2$ and $CH_4$) is supplied to the anode (16), where it is oxidized by oxygen ions ($O^{2-}$) from the electrolyte (17), which releases electrons to the external circuit. On the cathode (18) an oxidant such as $O_2$ or air is fed to the cathode, where it supplies the oxygen ions from the electrolyte by accepting electrons from the external circuit. The electrolyte (17) conducts these ions between the electrodes, maintaining overall electrical charge balance. The flow of electrons in the external circuit provides power (15), which may be siphoned off from the external circuit for other uses. Reaction products (12) are exhausted off the device. Excess air (14) may be passed through the device.

FIG. 2 illustrates a basic planar design for a solid state electrochemical device, for example a solid oxide fuel cell (SOFC). Typically and multitude of cells are "stacked" to make a "stack". In reality, there is no space between the stacks as shown in FIG. 2. The cell (10) includes an anode 16 (the "fuel (fuel 11) electrode") and a cathode (18) (the "air, (oxidant 13) electrode") and a solid electrolyte (17) separating the two electrodes. In conventional SOFCs, the electrolytes are typically formed from ceramic materials, since ceramics are able to withstand the high temperatures at which the devices are operated. For example, SOFCs are conventionally operated at about 950° C. This operating temperature is determined by a number of factors, in particular, the temperature required for the reformation of methane to produce hydrogen and reaction efficiency considerations. Also, typical solid state ionic devices such as SOFCs have structural element on to which the SOFC is built. In conventional planar SOFCs the structural element is a thick solid electrolyte plate such as yttria stabilized zirconia (YSZ); the porous electrodes are then screen printed onto the electrolyte.

In the case of a typical solid oxide fuel cell, the anode is exposed to fuel and the cathode is exposed to an oxidant in separate closed systems to avoid any mixing of the fuel and oxidants due to the exothermic reactions that can take place with hydrogen fuel.

The electrolyte membrane is normally composed of a ceramic oxygen ion conductor in solid oxide fuel cell applications. In other implementations, such as gas separation devices, the solid membrane may be composed of a mixed ionic electronic conducting material ("MIEC"). The porous anode may be a layer of a ceramic, a metal or, most commonly, a ceramic-metal composite ("cermet") that is in contact with the electrolyte membrane on the fuel side of the cell. The porous cathode is typically a layer of a mixed ionically and electronically-conductive (MIEC) metal oxide or a mixture of an electronically conductive metal oxide (or MIEC metal oxide) and an ionically conductive metal oxide.

Solid oxide fuel cells normally operate at temperatures between about 900° C. and about 1000° C. to maximize the ionic conductivity of the electrolyte membrane. At appropriate temperatures the oxygen ions easily migrate through the crystal lattice of the electrolyte. However, most metals are not stable at the high operating temperatures and oxidizing environment of conventional fuel cells and become converted to brittle metal oxides. Accordingly, solid-state electrochemical devices have conventionally been constructed of heat-tolerant ceramic materials. However, these materials tend to be expensive and still have a limited life in high temperature and high oxidation conditions. In addition, the materials used must have certain chemical, thermal and physical characteristics to avoid delamination due to thermal stresses, fuel or oxidant infiltration across the electrolyte and similar problems during the production and operation of the cells.

Since each fuel cell generates a relatively small voltage, several fuel cells may be associated to increase the capacity of the system. Such arrays or stacks generally have a tubular or planar design. Planar designs typically have a planar anode-electrolyte-cathode deposited on a conductive interconnect and stacked in series. However, planar designs are generally recognized as having significant safety and reliability concerns due to the complexity of sealing of the units and manifolding a planar stack.

In addition, conventional stacks of planar fuel cells operated at the higher temperature of approximately 1000° C. have relatively thick electrolyte layers compared to the porous anode and cathode layers applied to either side of the electrolyte and provides structural support to the cell. However, in order to reduce the operating temperature to less than 800° C., the thickness of the electrolyte layer has been reduced from more than 50-500 microns to approximately 5-50 microns. The thin electrolyte layer in this configuration is not a load bearing layer. Rather, the relatively weak porous anode and cathode layers must bear the load for the cell. Stacks of planar fuel cells supported by weak anodes or cathodes may be prone to collapse under the load.

Prior art stacks suffer from the fact that all four sides (if rectangular) are coupled to each other. This arrangement induces thermal and mechanical stresses during operation that cause various failures within cells in the stack, decreasing performance and lifetime of the device. In one attempt to solve the problems of the prior art U.S. Published application no. 20030096147 A1, published May 22, 2003, the contents of which are hereby incorporated by reference in its entirety for all purposes, discloses solid oxide fuel cell assemblys having packet elements having an enclosed interior formed in part by one or more compliant solid oxide sheet sections with a plurality of anodes disposed within the enclosed interior.

BRIEF DESCRIPTION OF THE DRAWINGS

FIG. 1 shows a prior art solid oxide fuel cell (SOFC) operation diagram.

FIG. 2 shows a prior art solid oxide fuel cell in planar arrangement consisting of multiple cells.

FIG. 3A shows a cross section of a unit comprising two cells in accordance with one embodiment of the present invention.

FIG. 3B shows a side view of the unit of FIG. 3A.

FIG. 3C shows a cross section from the top of the unit of FIG. 3A

FIG. 4 shows a unit in accordance with one embodiment of the present invention.

FIG. 5 shows a combination of units connected in one embodiment of the present invention.

FIG. 6 shows the current path for the combination of units shown in FIG. 5.

FIG. 7A shows a combination of units connected in one embodiment of the present invention.

FIG. 7B shows a combination of units connected in one embodiment of the present invention.

FIG. 7C shows one embodiment of the unit of FIG. 7A showing internal fuel flow.

FIG. 8A shows a combination of units connected in one embodiment of the present invention.

FIG. 8B shows a cross section of a unit comprising two cells in accordance with one embodiment of the present invention.

FIG. 8C shows a diagram of fuel flow in a unit as shown in FIG. 8A.

FIG. 8D shows a diagram of the fuel flow in a unit as shown in FIG. 8A.

FIG. 9 shows the relation between achievable volumetric power densities, area specific power density, and fuel cell membrane dimensions, at fixed aspect ratio.

FIG. 10 shows a plot depicting the performance of a CSO-electrolyte SOFC membrane at various temperatures.

FIG. 11 shows the performance curves for a SOFC in accordance with one embodiment of the present invention.

FIG. 12 shows OCP variation as a function of thermal cycle for a SOFC in accordance with one embodiment of the present invention.

DETAILED DESCRIPTION OF THE PREFERRED EMBODIMENT

By "cell" it is meant an electrochemical cell. In one embodiment of the present invention this means at least two electrodes with an electrolyte in between.

By "unit" it is meant at least two "cells" or "electrochemical cells" coupled in accordance with this invention. The term "unit" may include other structural elements such as housing, interconnect wires, pumps and other equipment for operation of fuel cell stacks. This may also be termed "chip" herein.

By "stack" as it is used here it is meant a plurality of "units" connected in a horizontal or vertical configuration. The electrical connections can be in series or parallel or a combination of series and parallel.

By "housing" it is meant some structure that encloses a unit or cell. The term "housing" is used generically herein, and does not refer to one specific shape or structure but to those structures that enclose the cell, chip and/or unit. An "endwall" may be part of the housing or these terms may be used interchangeably.

With reference to FIG. 3A there is shown a unit comprising two cells in accordance with one non-limiting embodiment of the present invention. There are two anodes facing inward and opposite (54, 56) separated by internal space (38) which space includes a fuel passageway (36). In one embodiment the internal space (38) and the fuel passageway (36) may be the same space so long as there is provided for a fuel passageway and the fuel is separate from the oxidant. Inwardly spaced electrodes (anodes here) are positioned so as to define a space there between (36 and 38) sufficient for passage of either a fuel or air during operation of the device It is understood that in accordance with one embodiment of the present invention the internal space is sealed to the outside atmosphere and the only material in communication with the anodes (54) and (56) is the fuel that is provided. In one embodiment the internal space (38) includes a fuel passageway that comprises tubing or other conduit means for supplying fuel to the anodes (54) and (56). The fuel passageway must have means of contacting the fuel with the anodes. Note that each cell is positioned adjacent to one another such that electrodes of one type (anodes (54, 56)) are facing inward toward one another and electrodes of the other type are each facing outward, cathodes. Layered on the outside of each anode (54) and (56) is an electrolyte (50) and (52) respectfully. The anode/electrolyte laminate is sealed at each end by seals. In FIG. 3A electronically conductive seal (60) seals the anode/electrolyte (54/50) and electronically conductive seal (62) seals the anode/electrolyte (56/52) at one end. Electronically insulating seal (64) seals the anode/electrolyte (54/50) and electronically insulating seal (66) seals the anode/electrolyte (56/52) at the other end. Layered on electrolyte (50) is a cathode (40) with current collector (41) passing through and in intimate contact with the cathode. Layered on electrolyte (52) is a cathode (44) with current collector (45) passing through and in intimate contact with the cathode. Each current collector (41) and (45) extends through the cathode (40) and (44) and extends into a housing (24) via leads or wires or interconnect (42) and (46) such that the cathode is in electrical contact with housing (24). In some embodiments the current collector (41) and (45) is the same material as the leads or wires or interconnect (42) and (46). In other embodiments the current collector may be a silver paste and the leads, wires or interconnects (42) and (46) would then comprise a wire or mesh or other material suitable for electrical use. Housing members (22) and (24) each have male and female ends (22A, 22B)(male and female ends, respectfully) (24A) and (24B) (male and female ends respectfully) for connecting one or more units together. The first electrochemical cell and the second electrochemical cell are sealed to one another by a seal at the first end (60, 62) and a seal at the second end (64, 66). Housing members (22) and (22A) and (22B) are electronically conductive. Housing members (24) and (24A) and (24B) are electronically conductive. The invention contemplates that a multitude of these units may be connected via the connecting elements (22A, 22B, 24A and 24B). It is understood that the shape of the connectors is only one embodiment any connector will be suitable so long as the proper current flow path is preserved. The unit may be housed in a housing which is defined by endplate (32). Note that in a preferred embodiment the connectors (22A, 22B, 24A and 24B) may extend past the housing. Also, endplate or housing members (32) and (32) are not necessary and the cathode may be exposed to ambient air during operation. Air intake (26) is provided for each cell so that each cathode is exposed to atmosphere. The endplate or housing may have any structure depending on the desired end use, so long as there is communication means (26) for supplying air to the cathodes. This communication means (26) may just be that there is no end plate, housing (32) and the cathode is exposed to ambient air. Air exhaust (28) is provided for exhaust air. The invention contemplates that in one embodiment the insulating seals (64, 66) may function as the base, eliminating a need for further housing structure.

While not wishing to be bound by any particular theory or principle, with reference to FIG. 3A operation of a SOFC in one embodiment of the invention proceeds as follows. An oxidant, preferably air which provides $O_2$ is supplied. Fuel, preferably hydrogen is supplied to be in contact with the anode through fuel channel (36). In a preferred embodiment of the present invention, fuel is supplied to two anodes at one time. Electrons supplied to the cathode will reduce the oxygen to $O^{2-}$ ($O_2+4e- \rightarrow 2O^{2-}$). Oxygen ions will be ionically transported across each electrolyte to the anode. When the oxygen ions reach the fuel at the anode they oxidize the hydrogen to $H_2O$ and the CO to $CO_2$. In doing so they release electrons, and if the anode and cathode are connected to an external circuit this flow of electrons is seen as a dc current. Electric power is drawn from housing (24) and (22), with (24) being positive and (22) being negative. This process continues as long as fuel and air are supplied to the cell.

The fuel electrode in accordance with the present invention (54) and (56) may comprise a porous ferritic stainless steel for example in Steven J. Visco, Craig P. Jacobson, Igor Villareal, Andy Leming, Yuriy Matus and Lutgard C. De Jonghe, DEVELOPMENT OF LOW-COST ALLOY SUPPORTED SOFCS, Proc. ECS meeting, Paris, May 2003, the content of which are hereby incorporated by reference in its entirety for all purposes, about 0.4 mm thick, activated by incorporation of a Ni/CSO dispersion. Additionally, stable increased catalytic activity may be obtained by post-infiltration with compounds that form nano-scale catalyst particles near or at the electrolyte/anode interface, as in K. Yamahara, Craig P. Jacobson, Steven J. Visco, Lutgard C. De Jonghe, High-Performance Thin Film SOFCs for Reduced Temperature, Proceedings SSI 14, Monterey, Calif., 2003, the contents of which are hereby incorporated by reference in their entirety for all purposes. The ferritic steels have thermal expansion coefficients that can match those of the ceramic electrolyte nearly perfectly, thereby avoiding thermal stresses and allowing for high heating rates and thermal cycling. The cathode current collection may be facilitated by a supporting stainless steel mesh or Ag mesh that is incorporated in the $La_{0.60}Sr_{0.40}Co_{0.98}Ni_{0.002}O_{3-\delta}$ (LSCN) cathode. The anode-supported thin film samaria doped ceria (CSO) may be produced by colloidal processing and co-firing as disclosed in U.S. Pat. No. 6,458,170 the contents of which are hereby incorporated by reference in its entirety for all purposes. Materials for the electrolyte and electrodes are known in the art. Several materials choices impose themselves as suitable for the present invention. Preferred are solid electrolytes include samaria-doped ceria (CSO), gadolinia doped ceria (CGO), yttria stabilized zirconia (YSZ), scandia stabilized zirconia, and $La_{0.9}Sr_{0.1}Ga_{0.8}Mg_{0.2}O_{3-\delta}$ (LSGM). Previous work by the present inventors has demonstrated obtainable area specific power in excess of 500 mW/cm$^2$ between 600 and 650° C., for a fuel cell membrane with a Lanthanum-Strontium-Cobalt-Nickel oxide (LSCN)/samaria-doped ceria (CSO) composite cathode, and a Ni/CSO composite anode (C. P. Jacobson, S. J. Visco, and L. C. De Jonghe, THIN-FILM SOLID OXIDE FUEL CELLS FOR INTERMEDIATE TEMPERATURE (500-800° C.) OPERATION, Proc. Of the Processing and Characterization of Electrochemical Materials and Devices, Apr. 25-28, 1999, The American Ceramic Society).

FIG. 3B shows a side view of the cell (20) of FIG. 3A. With reference to FIG. 3B there are insulating layers (70, 72) between the housing end plates (30, 32), which are optional. The current collector (42) shown comprises a wire mesh of felt screen, but the invention is not so limited. Any means or current collector known in the art is suitable for this invention including conductive pastes known in the art. Fuel inlet (34) and exhaust (36) are shown.

FIG. 3C shows a cross section view from the top of FIG. 3A. Insulating layers (70, 72) are shown which insulate the housing from the endplates (30 and 32).

FIG. 4 shows a unit (20) with endplates (30, 32) containing two cells in one embodiment of the present invention. The present invention contemplates that a plurality of units (20) may be coupled via connector (22A, 24A) to create a stack of units as shown in FIG. 5. The device shown in FIG. 4 operates as the device described in FIG. 3A-3C. The cathode (40) for one cell is shown as is the electrolyte (50). Seal (64) insulates the anode (not shown) from the housing (24). In operation, the unit (20) of FIG. 4 may function alone or be connected to other units. If connected with another unit at connectors (22A and 24A) there is a space defined on one side by the cathode (40) and on the other side by the cathode (40) of the other coupled unit (20). The space may communicate via opening (26) and (28) with the cathode for air inlet and exhaust such that the air will be exposed to the cathode (40). These openings may be exposed to ambient air or have some external supply of an oxidant gas. Opening (34) is a fuel passageway and not shown in FIG. 4 is the internal space (36, 38 of FIG. 3A) for fuel transport to the fuel electrode, in this case the anode.

FIG. 5 shows a stack (68) which consists of plurality of units connected in one embodiment of the present invention. Housing (22, 24) includes the connecting elements that are depicted in FIG. 3A as (22A, 22B) and serves to connect the anode from one unit to the cathode of another unit. Electrically insulating endplates (housing) members (30) are optional. Conducting members (76) provide electrical connection between units for electron transfer. In operation fuel inlet (34) provides means for supplying a fuel to the internally spaced apart anodes of the unit. The invention contemplates that the means for supplying fuel through (34) is not limited to the shape of the device shown. Any means for communicating fuel to the anode is contemplated, and tubes, piping or other means are within the scope of the present invention. Exhaust fuel is exhausted on the other side of the units, not shown. In FIG. 5 only top insulators and conductor members (74, 76) are shown. The current path for a stack (68) of units (20) is shown in FIG. 6 by the arrow. Note that the top and bottom connectors change between insulating (74) and conducting (76). Housing (22, 24) is electrically conducting.

Another embodiment of the present invention is shown in FIGS. 7A-7C. A stack (90) comprising five units (92), each unit comprising two cells having spaced apart anodes similar to that shown in FIG. 3A. (82) defines a fuel manifold made of an electrically conductive material, such as steel, but any suitable material known in the art may be used. One skilled in the art will appreciate that different embodiments and structures such as tubing will be appropriate for the fuel manifold. If an electrically insulating material is used, such as a ceramic, the insulators (93) will not be necessary. The manifold (82) as shown in this embodiment has a chamber (84) for communicating fuel to the cell anodes via a pathway similar to that shown in FIG. 7C. With reference to FIG. 7A and FIG. 7B, (94) is part of the fuel manifold and is in electrical contact with the anode and is electrically connected to the cathode of the next unit so that the units are connected in series. An electronically insulating seal (93) is needed if the fuel manifold (82) is conductive. Lead wires (99) and (98) is connected to an external circuit, load or in a cell to cell bundle. FIG. 7B shows a diagram of the current flow in the device of FIG. 7A during operation of the stack. The cells are connected anode to cathode in series via interconnect wire (97). FIG. 7C is a diagram the internal fuel path for one unit (90) of the stack (80) in FIG. 7A. Open air space (85) is present between the fuel manifold (82) and the chip. Fuel travels through the passageway defined by fuel manifold (96) and makes contact with the anode (111) and is exhausted through the exhaust fuel manifold passageway defined by fuel manifold (94). With reference to FIG. 7C both air electrodes form an outwardly facing side (111, shown for one electrode) of the unit (90) and are exposed to ambient air, and the unit has a first side edge and a second side edge, the first side edge and second side edge are sealed by an manifold (96 and 94), said manifolds defining an enclosed space between the first side edge manifold (note arrow for fuel flow), the spaced apart fuel electrodes and the second side edge manifold (94), such that during operation fuel may be passed from one side edge manifold (96) through the enclosed space between the fuel electrodes and through the other side edge manifold (94).

A preferred embodiment of the present invention is shown in FIGS. 8A-8D. A stack (100) is provided with five units (110) connected to a fuel manifold (102). In the diagrams presented herein, the number of units is variable and is dependent on the desired end use. There may be as few as two or hundreds or thousands. Each unit (110) of the stack (100) has at least two spaced apart anodes with a space for fuel passage in between. Opposite the anodes and outwardly extending is disposed an electrolyte and a cathode with a current collector (not shown). In one preferred embodiment, the units internal fuel path is shown in FIGS. 8C and 8D. Fuel path is shown by the arrow. In FIG. 8C fuel enters the manifold (104) and enters the cell through passageway or conduit (134) where it is in then in contact with two anodes, one from each cell. In a preferred embodiment, the space between the anodes has structures or "separators" therein to channel the flow in any desired flow path one of which is shown in FIG. 8C (172). In another embodiment the internal flow structure may be changed by adding further structure (172). Members (172) of FIGS. 8C and 8D may have holes therein or be porous. The separators (172) may have any shape depending on the desired end use, and may not be a straight element as shown, but may have curves. The members or separators (172) are disposed in the space between the fuel electrodes. FIG. 8B shows a schematic of two units (110) of stack (100) of FIG. 8A which are connected in series for operation. The first and second electrochemical cells (which comprise unit 110) are sealed at a first end with an electrically insulating seal (164, 166, note this seal may be one unit or two seals), the first and second electrochemical cells are sealed at a second end with an electrically conductive seal (160, 162) which may be the same seal or separate seals and air electrodes (140) disposed outwardly of the electrolyte of the first electrochemical cell and the second electrochemical cell. The invention contemplates that any number of these units may be connected. In this preferred embodiment the cathodes (144, 140) are exposed to the air and open to the ambient atmosphere without further housing. Current collector (145) extends through a first cathode on one side of a unit and over the unit through the cathode on the other side of the unit and is in electrical contact via lead (146) with housing unit (122) and (124). In this configuration the cathode of one unit is in electrical contact with the anode of the other unit. Electrical insulator (170) prevents electrical contact between two units. Fuel inlet manifold (134) allows fuel to communicate with internal space (138) between the anodes (154) and (156). Electrically insulating members (164) and (166) prevent the current collector from being in electrical contact with the anode. In FIG. 8B the current collector is embedded within the cathode. The present invention contemplates that the current collector may be deposited on top of the cathode. One advantage of the present invention over the prior art is that in a preferred embodiment the units are capable of being "fixed" along only one edge, as shown in FIG. 8B. This advantage simplifies construction and handling of the devices. It also allows for spaces such as (85) in FIG. 7C which promotes air flow and cooling. Devices made in accordance with this invention may eliminate an interconnect sheet which will result in lighter devices overall. This will also aid in avoiding alloy contamination with external layers. Another advantage of this embodiment is that at least two of the sealed edges of the present unit are not in contact with the sealed edges of adjacent units.

The invention contemplates that the structures described herein are to be used as oxygen generators as well as SOFC devices. For example, in FIG. 8B use as an oxygen generator current is supplied to the device and oxygen is produced at the anode. Input would comprise air at the cathode.

In a preferred embodiment the devices of this invention are contemplated to have at least 100 mW/cm$^2$ at 600-650° C. for a unit cell solid oxide fuel cell and preferably at least 200 mW/cm$^2$. The SOFC stack has projected power densities ranging from 0.8 kW/liter (@200 mW/cm$^2$) to 1.75 kW/liter (@400 mW/cm$^2$), and can be assembled simply by combining the unit cells, without introducing significant additional sealing or manifold difficulties. The invention contemplates that this performance will be achieved with fuel/oxidant combinations of ($H_2$, $H_2O$)/air and reformed hydrocarbon/air, but any fuels may be used. The present invention contemplates that the fuel cells disclosed herein may also be run on other fuels, such as alcohols, propane, and butane and this operation is well known to those with skill in the art.

In one embodiment the membrane is mounted in a stainless steel supporting structure that in part also serves to provide a current path for series/parallel operation, when incorporating the proper combination and placement of insulating and conducting sealing compounds. In one embodiment this invention contemplates that unit cells are be prepared for which the active cell area is approximately 1 cm$^2$ to 100 cm$^2$, preferably between 4 and 520 cm$^2$. It should be noted that a complete unit cell incorporates all the challenges associated with combining such cells in a series stack arrangement.

The dimensions of the unit cells are constrained by the need to have efficient edge current-collection. This is in turn determined by the in-plane conductivity of the electrodes, by non-active edge areas, etc. While not being limited to any particular dimension, calculations based on these factors and on the known electronic resistance of the various materials involved in the electrodes indicate that a maximum length for edge current collection, with a potential drop of less than 50 mV, is between 4 and 5 cm. The projected performance of the fuel cell will therefore be sensitive to a number of geometrical factors as well as to the intrinsic power per unit electrode area. FIG. 9 considers these factors, with an example fuel cell membrane aspect ratio of 2. Even at modest area specific power densities of 200 mW/cm$^2$, 1 kW/liter can be achieved. FIG. 10 shows a plot depicting the performance of a CSO-electrolyte SOFC membrane at various temperatures.

The construction of the unit and the stack minimizes stress transfer to the cells. The sealing and electrical connections allows for the use of cells manufactured to lower dimensional tolerance than in the prior art, thus lower cost. The flexibility in the unit architecture and the series assemblies can be readily envisioned to lead to combinations that range from a few 10s of Watts to 10s of kilowatts, in highly compact power generating devices. Anode gas flow can be in a cascade arrangement to increase stack efficiency.

Units and cells in accordance with the present invention have been made as follows. Stainless steel 316 tube (McMaster, 0.125" OD), 430 stainless steelfoil (Allegheny Technologies, 0.25 mm thick) and Ebrite strip (Allegheny Technologies, 0.6604 mm thick) are machined into a cell holder.

Single cells in accordance with one embodiment of the present invention were fabricated by a tape casting approach. 12.5 g nickel oxide (NiO; J. T. Baker) and 12.5 g 8 mol % ytrria doped zirconia (YSZ; Tosoh Ceramics) (50:50 wt %) powders were ball milled for 24 hrs in a 125 mL plastic bottle containing 80 g YSZ balls (3 mm in diameter, Tosoh Ceramics), 25 mL distilled water and 1 mL Duramax D3005 dispersant (Rohm Hass). 6 mL Duramax B1000 (Rohm Hass) and 4 mL HA-12 (Rohm Hass) binders were then added to form NiO—YSZ slurry. After evaporation of excessive water, the slurry was cast onto a mylar sheet and dried at ambient temperature. The green tape was then cut into less rectangular (27 mm by 32 mm), and preheated using the temperature profile of 1° C./min to 600° C.; dwell 1 hr; 5° C./min to 1100° C.; dwell 2 hrs; 5° C./min to room temperature. An aerosol spray method was used deposit thin-film (10 μm) YSZ electrolyte. 2 g YSZ, 0.1 g fish oil and ~0.025 g DBT were attrition milled in 25 mL IPA for 1.5 hr at 550 RPM. The solution was transferred to a graduate bottle and added IPA to a total volume of 50 mL. The solution was then sonicated for 5 minutes and sprayed on the NiO—YSZ anode support and the bilayer structure was sintered using the temperature profile of 3° C./min to 600° C.; 5° C./min to 1400° C.; dwell 2 hrs; 5° C./min to room temperature. A ~10 μm $La_{0.6}Sr_{0.4}Fe_{0.8}Co_{0.02}O_{3-\delta}$ (LSCF; Praxair Specialty Ceramics) was applied to the YSZ electrolyte using the aerosol spray method, and was then sintered using the temperature profile (3° C./min to 600° C.; 5° C./min to 800° C.; dwell 4 hrs; 5° C./min to room temperature) to form the LSCF cathode. The dimension of the prepared single cells is 23.5 mm*20 mm*0.5 mm and the active area of the LSCF cathode is 15 mm*18 mm. Silver current collectors (Alfa Aesar) were attached to both anodes and cathodes and heated to 800° C. for 1 hr.

Two single cells were faced to each other and NiO—YSZ strips (~2 mm thick) were inserted between the cells to form an anode chamber having a rib structure for conducting a fuel flow. The combined single cells were bonded to the 430SS braces on the top of the cell holder. High-temperature adhesive (AREMCO 552VFG) was used to seal all the edges between the 430SS braces and the exposed YSZ electrolyte and the open ends between the single cells to complete the preparation of a chip SOFC in accordance with one embodiment of the present invention.

The chip SOFC was installed into a furnace. 97%$H_2$+ 3%$H_2O$ mixture was fed from one of the 316SS tube to the anode chamber, and the cathodes were exposed to open air. The 552VFG was cured using a temperature profile of 2° C./min to 93° C.; dwell 2 hrs; 2° C./min to 260° C.; dwell 2 hrs; 2° C./min to 371° C.; dwell 2 hrs. Then the chip SOFC was raised to 600° C. and its performance was measured and shown in FIG. 11. The cell maximum power density is ~1138 mW/cm$^2$ so that the chip SOFC (active cathode area is: 2*1.5 cm*1.8 cm=5.4 cm$^2$) is able to output ~754 mW at 600° C.

Another chip SOFC was constructed using anode supported single cells (In DEC Type ASC2) and Pt instead of Ag was used as current collectors. The chip SOFC was thermally cycled between 200° C. and 700° C. using a temperature change rate of 3° C./min. 97%$H_2$+3%$H_2O$ mixture was fed from one of the 316SS tube to the anode chamber, and the cathodes were exposed to open air. The open circuit voltage (OCP) of the chip SOFC at 700° C. was measured as a function of thermal cycles and is plotted in FIG. 12. The initial OCP was ~1.063V, implying good quality of the 552VFG seal. The OCP after 73-times thermal cycles is ~1.035V, which indicates the good stability of the constructed chip SOFC using the materials chosen.

All references, patents and published patent applications disclosed herein are expressly incorporated by reference in their entirety for all purposes.

What is claimed is:

1. A solid state electrochemical device, comprising:
   an electrically conductive housing member;
   at least one unit in electrical contact with said conductive housing member, said unit comprising a first electrochemical cell and a second electrochemical cell,
   each electrochemical cell comprising a laminate of a first fuel electrode and a second air electrode, separated by a planar, solid state electrolyte, said air electrode having a current collector attached thereto, the current collector of at least one of said air electrodes connected to said electrically conductive housing member,
   the first and second electrochemical cells having a first end and a second end, and sealed to one another by a seal at their first and second ends, the seal at the first end electrically conductive, the seal at the second end electrically insulating, and wherein
   each electrochemical cell is positioned adjacent to one another such that electrodes of one type are facing inward toward one another and the electrodes of the other type are each facing outward, the inwardly spaced electrodes positioned so as to define a space there between sufficient for passage of a gas during operation of the device.

2. The solid state electrochemical device as claimed in claim 1, wherein:
   the fuel electrodes are facing inward and opposite each other.

3. The solid state electrochemical device as claimed in claim 1, wherein:
   the seal at the first end is electrically conductive and is connected to a housing that is electrically conductive, and the seal at the second end is electrically insulating and is connected to a housing that is electrically conductive.

4. The electrochemical device as claimed in claim 1, wherein:
   the current collector is embedded in the air electrode.

5. The electrochemical device as claimed in claim 1, wherein:
   the current collector is on top of the air electrode.

6. The electrochemical device as claimed in claim 1, wherein:
   the current collector of the air electrode of the first cell is connected to the air electrode of the second cell, and the air electrode of the second cell is electrically connected to the housing member.

7. An electrochemical device as claimed in claim 1, further comprising:
   a plurality of fuel cell units, each unit connected to at least one other adjacent unit, such that during operation of the device current is able to flow from one unit to the adjacent unit.

8. An electrochemical device as claimed in claim 1, wherein:
   both air electrodes form an outwardly facing side of the unit and are exposed to ambient air, and the unit has a first side edge and a second side edge, wherein:
   the first side edge is sealed by a first side edge manifold and the second side edge is sealed by a second side edge manifold, said manifolds defining an enclosed space between the first side edge manifold, the spaced apart fuel electrodes and the second side edge manifold, such that during operation fuel may be passed from the first side edge manifold through the enclosed space between the fuel electrodes and through the second side edge manifold.

9. The electrochemical device as claimed in claim 8, further comprising:
   a fuel manifold comprising a first inlet section and a second exhaust section separated from the first inlet section, and wherein the first side edge manifold is connected to the fuel manifold first inlet section and the second side edge manifold is connected to the fuel manifold second exhaust section.

10. The electrochemical device as claimed in claim 9, further comprising:
    an electrically insulating seal between the first and second side edge manifolds and the fuel manifold.

11. The electrochemical device as claimed in claim 10, further comprising: separators disposed in the space between the fuel electrodes.

12. The electrochemical device as claimed in claim 9, further comprising:
    a plurality of units attached to the fuel manifold, wherein:
    the units are exposed to ambient atmosphere except where connected to the fuel manifold and the units are electrically connected in series so that current may flow from one unit to another unit.

13. The electrochemical device as claimed in claim 1, wherein:
    the fuel electrode and electrolyte of the first electrochemical cell are sealed at a first end, the fuel electrode and electrolyte of the second electrochemical cell are sealed at a first end, and wherein:
    the seal for the first cell and the seal for the second cell may be the same seal or different seals.

14. The electrochemical device as claimed in claim 13, wherein:
    the first and second electrochemical cells are sealed at a first end with an electrically insulating seal, the first and second electrochemical cells are sealed at a second end with an electrically conductive seal, and further comprising:
    air electrodes disposed outwardly of the electrolyte of the first electrochemical cell and the second electrochemical cell.

15. The electrochemical device of claim 14, further comprising:
    a current collector attached to the air electrode of the first electrochemical cell, said current collector operatively attached to the air electrode of the second electrochemical cell.

16. The electrochemical device as claimed in claim 14, further comprising:
    a plurality of units, each of said plurality of units having an adjacent unit, and wherein the adjacent units are electrically connected by an interconnect wire that connects the current collector of the air electrode of the second electrochemical cell to the electrically conductive seal of the first electrochemical cell in an adjacent unit.

17. The electrochemical device as claimed in claim 16, wherein:
    the current collector is embedded in the air electrode.

18. The electrochemical device as claimed in claim 16, wherein:
    the current collector is on top of the air electrode.

19. An electrochemical device as claimed in claim 14, wherein:
    the air electrodes form outwardly facing opposite sides of the unit and are exposed to ambient air, and the unit has a first side edge and a second side edge, wherein:

the first side edge is sealed by a first side edge manifold and the second side edge is sealed by a second side edge manifold, said manifolds defining an enclosed space between the first side edge manifold, the spaced apart fuel electrodes and the second side edge manifold, such that during operation fuel may be passed from the first side edge manifold through the enclosed space between the fuel electrodes and through the second side edge manifold.

20. The electrochemical device as claimed in claim 14, further comprising:

separators disposed in the space between the fuel electrodes.

21. The electrochemical device as claimed in claim 14, wherein:

the device is a solid oxide fuel cell.

* * * * *